(12) United States Patent
McKenney

(10) Patent No.: US 9,400,818 B2
(45) Date of Patent: *Jul. 26, 2016

(54) HIGHLY SCALABLE TREE-BASED TRYLOCK

(71) Applicant: International Business Machines Corporation, Armonk, NY (US)

(72) Inventor: Paul E. McKenney, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 388 days.

This patent is subject to a terminal disclaimer.

(21) Appl. No.: 14/027,408

(22) Filed: Sep. 16, 2013

(65) Prior Publication Data

US 2014/0379678 A1     Dec. 25, 2014

Related U.S. Application Data

(63) Continuation of application No. 13/924,667, filed on Jun. 24, 2013.

(51) Int. Cl.
    *G06F 17/30*         (2006.01)

(52) U.S. Cl.
    CPC ................ *G06F 17/30359* (2013.01)

(58) Field of Classification Search
    CPC ................................. G06F 17/30359
    USPC ........................................ 707/704
    See application file for complete search history.

(56) References Cited

U.S. PATENT DOCUMENTS

| | | |
|---|---|---|
| 5,442,758 A | 8/1995 | Slingwine et al. |
| 5,608,893 A | 3/1997 | Slingwine et al. |
| 5,727,209 A | 3/1998 | Slingwine et al. |
| 6,219,690 B1 | 4/2001 | Slingwine et al. |
| 6,480,918 B1 | 11/2002 | McKenney et al. |
| 6,662,184 B1 | 12/2003 | Friedberg |
| 6,842,809 B2 | 1/2005 | Browning et al. |
| 6,886,162 B1 | 4/2005 | McKenney |
| 6,996,812 B2 | 2/2006 | McKenney |
| 7,191,272 B2 | 3/2007 | McKenney |
| 7,287,135 B2 | 10/2007 | McKenney et al. |
| 7,349,926 B2 | 3/2008 | McKenney et al. |
| 7,353,346 B2 | 4/2008 | McKenney et al. |

(Continued)

OTHER PUBLICATIONS

Article entitled "Is Parallel Programming Hard, and, If so, What Can You Do About It?", by McKenney, dated Dec. 16, 2011.*

(Continued)

*Primary Examiner* — Mahesh Dwivedi
(74) *Attorney, Agent, or Firm* — Walter W. Duft

(57) ABSTRACT

A tree-based trylock technique for reducing contention on a root trylock includes attempting to acquire a trylock at each node of a tree-based hierarchical node structure while following a traversal path that begins at a leaf node, passes through one or more of internal nodes, and ends at a root node having the root trylock. The trylock acquisition operation succeeds if each trylock on the traversal path is acquired, and fails if any trylock on the traversal path cannot be acquired. A trylock housekeeping operation releases all non-root trylocks visited by the trylock acquisition operation, such that if the trylock acquisition operation succeeds, only the root trylock will be remain acquired at the end of the operation, and if the trylock acquisition operation fails, none of the trylocks will be remain acquired at the end of the operation.

7 Claims, 11 Drawing Sheets

(56) References Cited

U.S. PATENT DOCUMENTS

| | | | |
|---|---|---|---|
| 7,395,263 B2 | 7/2008 | McKenney | |
| 7,395,383 B2 | 7/2008 | McKenney | |
| 7,426,511 B2 | 9/2008 | McKenney | |
| 7,454,581 B2 | 11/2008 | McKenney et al. | |
| 7,472,228 B2 | 12/2008 | McKenney et al. | |
| 7,500,036 B2 | 3/2009 | McKenney et al. | |
| 7,653,791 B2 | 1/2010 | McKenney | |
| 7,668,851 B2 | 2/2010 | Triplett | |
| 7,689,789 B2 | 3/2010 | McKenney et al. | |
| 7,734,879 B2 | 6/2010 | McKenney et al. | |
| 7,734,881 B2 | 6/2010 | McKenney et al. | |
| 7,747,805 B2 | 6/2010 | McKenney | |
| 7,814,082 B2 | 10/2010 | McKenney | |
| 7,814,488 B1* | 10/2010 | Dice | G06F 9/526 707/704 |
| 7,818,306 B2 | 10/2010 | McKenney et al. | |
| 7,873,612 B2 | 1/2011 | McKenney et al. | |
| 7,904,436 B2 | 3/2011 | McKenney | |
| 7,934,062 B2 | 4/2011 | Mckenney et al. | |
| 7,953,708 B2 | 5/2011 | Mckenney et al. | |
| 7,953,778 B2 | 5/2011 | Mckenney et al. | |
| 7,975,271 B2 | 7/2011 | Anderson | |
| 7,987,166 B2 | 7/2011 | Mckenney et al. | |
| 8,020,160 B2 | 9/2011 | McKenney | |
| 8,055,856 B2 | 11/2011 | Coon et al. | |
| 8,055,860 B2 | 11/2011 | McKenney et al. | |
| 8,055,918 B2 | 11/2011 | McKenney et al. | |
| 8,060,880 B2 | 11/2011 | Cherem et al. | |
| 8,069,445 B2 | 11/2011 | Ma | |
| 8,108,696 B2 | 1/2012 | Triplett | |
| 8,126,843 B2 | 2/2012 | McKenney et al. | |
| 8,176,023 B2 | 5/2012 | Graefe | |
| 8,176,489 B2 | 5/2012 | Bauer et al. | |
| 8,185,704 B2 | 5/2012 | McKenney et al. | |
| 8,195,893 B2 | 6/2012 | Triplett | |
| 8,219,587 B2 | 7/2012 | Odaira | |
| 8,224,977 B2 | 7/2012 | Loaiza et al. | |
| 8,234,646 B2* | 7/2012 | Michael | G06F 9/526 707/704 |
| 8,307,173 B2 | 11/2012 | McKenney | |
| 8,327,187 B1* | 12/2012 | Metcalf | G06F 12/10 714/10 |
| 8,407,503 B2 | 3/2013 | McKenney | |
| 2004/0073909 A1* | 4/2004 | Arimilli | G06F 9/52 718/105 |
| 2005/0289550 A1* | 12/2005 | Blackmore | G06F 9/526 718/102 |
| 2006/0112121 A1 | 5/2006 | McKenney et al. | |
| 2006/0265373 A1 | 11/2006 | McKenney et al. | |
| 2008/0082532 A1 | 4/2008 | McKenney | |
| 2008/0313238 A1 | 12/2008 | McKenney et al. | |
| 2009/0006403 A1 | 1/2009 | McKenney | |
| 2009/0077080 A1 | 3/2009 | McKenney | |
| 2009/0271793 A1 | 10/2009 | Rostedt | |
| 2009/0320030 A1 | 12/2009 | Ogasawara | |
| 2010/0191711 A1* | 7/2010 | Carey | G06F 9/52 707/704 |
| 2011/0055183 A1* | 3/2011 | McKenney | G06F 9/526 707/704 |
| 2011/0283082 A1 | 11/2011 | McKenney et al. | |
| 2012/0047140 A1 | 2/2012 | McKenney et al. | |
| 2012/0089784 A1 | 4/2012 | Surtani et al. | |
| 2012/0144129 A1 | 6/2012 | McKenney | |
| 2012/0198460 A1 | 8/2012 | Luo et al. | |
| 2012/0324170 A1 | 12/2012 | McKenney | |
| 2012/0324461 A1 | 12/2012 | McKenney | |
| 2012/0324473 A1 | 12/2012 | McKenney | |
| 2012/0331237 A1 | 12/2012 | McKenney | |
| 2012/0331238 A1 | 12/2012 | McKenney | |
| 2013/0061071 A1 | 3/2013 | McKenney | |
| 2013/0138896 A1 | 5/2013 | McKenney | |
| 2013/0151488 A1 | 6/2013 | McKenney et al. | |
| 2013/0151489 A1 | 6/2013 | McKenney et al. | |
| 2013/0151524 A1 | 6/2013 | McKenney et al. | |
| 2013/0151798 A1 | 6/2013 | McKenney | |
| 2013/0151811 A1 | 6/2013 | McKenney et al. | |
| 2013/0152095 A1 | 6/2013 | McKenney | |
| 2014/0074841 A1* | 3/2014 | Majnemer | G06F 17/30327 707/737 |

OTHER PUBLICATIONS

J. Seigh, "RCU + SMR for preemptive kernel/user threads," Linux Kernel Mailing List, May 9, 2005, 2 pages.

M. Michael, "Hazard Pointers: Safe Memory Reclamation for Lock-Free Objects," IEEE Transactions on Parallel and Distributed Systems, Jun. 2004, vol. 15, No. 6, pp. 491-504.

D. Sarma et al., "Making RCU Safe for Deep Sub-Millisecond Response Realtime Applications," 2004 USENIX (UseLinux track) Jun. 2004, 9 pages.

P. McKenney, "RCU vs. Locking Performance on Different CPUs," 2004 Linux.conf.au, 2004, 18 pages.

P. McKenney et al., "Scaling dcache with RCU," Linux Journal, Jan. 1, 2004, 12 pages.

P. McKenney et al., "Using RCU in the Linux 2.5 Kernel," Linux Journal, Oct. 1, 2003, 11 pages.

P. McKenney et al.,"Read-Copy Update," 2002 Ottawa Linux Symposium, Jul. 8, 2002, 32 pages.

H. Lindar et al., "Scalability of the Directory Entry Cache," 2002 Ottawa Linux Symposium, Jun. 26, 2002, pp. 289-300.

P. McKenney et al., "Read-Copy Update," 2001 Ottawa Linux symposium, Jul. 2001, 22 pages.

P. McKenney et al., "Read-Copy Update: Using Execution History to Solve Concurrency Problems," PDCS, Oct. 1998, 11 pages.

S. Dietrich et al., "Evolution of Real-Time Linux," 7th RTL Workshop, Nov. 17, 2005, 18 pages.

B. Gamsa, "Tornado: Maximizing Locality and Concurrency in a Shared Memory Multiprocessor Operating System," 1999, 14 pages.

Molnar et al., "Realtime and Linux," 2005 Linux Kernel Summit, 8 pages.

H. Boehm, "The Space Cost of Lazy Reference Counting," ACM SIGPLAN Notices, Proceedings of the 31st ACM SIGPLAN-SIGACT Symposium on Principles of Programming Languages, POPL '04, vol. 39, Issue 1, Jan. 2004, p. 210-219.

M. Michael, "Scalable Lock-Free Dynamic Memory Allocation," ACM SIGPLAN Notices, Proceedings of the ACM SIGPLAN 2004 Conference on Programming Language Design and Implementation; PLDI '04, vol. 39, Issue 6, Jun. 2004, p. 35-46.

D. Dice et al., "Mostly Lock-Free Malloc," ACM SIGPLAN Notices, Proceedings of the 3rd International Symposium on Memory Management, ISMM '02, vol. 38, Issue 2 Supplement, Jun. 2002, p. 163-174.

J. Corbet, "Read-copy-update for realtime," LWN.net, Sep. 26, 2006, 3 pages.

McKenney, "Seven real-time Linux approaches (Part C)", LinuxDevices.com, Jun. 7, 2005, 13 pages.

P. McKenney, "RCU and CONFIG_PREEMPT_RT progress," Linux Kernel Mailing List, May 9, 2005, 2 pages.

O. Nesterov, QRCU: 'Quick' SRCU Implementation, Linux Kernel Mailing List, Dec. 1, 2005, 3 pages.

P. McKenney, "Sleepable RCU", LWN.net, Oct. 9, 2006, 10 pages.

P. McKenney, "Read-Copy Update Implementations", 2001, 3 pages.

M. Herlihy, "A Methodology for Implementing Highly Concurrent Data Objects," ACM Transactions on Programming Languages and Systems, vol. 15, Issue 5, Nov. 1993, pp. 745-770.

M. Michael, "Safe Memory Reclamation for Dynamic Lock-Free Objects Using Atomic Reads and Writes," Proceedings of the 21st Annual ACM Symposium on Principles of Distributed Computing, Jul. 2002, 10 pages.

N. Barghouti et al., "Concurrency Control in Advanced Database Operations," Jan. 1994, 83 pages.

P. McKenney, "Exploiting Deferred Destruction: An Analysis of Read-Copy-Update Techniques in Operating System Kernels," OGI School of School of Science & Engineering at Oregon Health & Science University, Jul. 2004, pp. 1-380.

P. McKenney et al., "Extending RCU for Realtime and Embedded Workloads," 2006 Ottawa Linux Symposium, Aug. 11, 2006, 15 pages.

(56) References Cited

OTHER PUBLICATIONS

P. McKenney, "The design of preemptible read-copy-update," LWN.net, Oct. 8, 2007, 27 pages.
P. McKenney, "Integrating and Validating dynticks and Preemptible RCU," LWN.net, Apr. 22, 2008, 19 pages.
P. McKenney, "Hierarchical RCU," LWN.net, Nov. 4, 2008, 19 pages.
P. McKenney, "Is Parallel Programming Hard, and, If so, What Can You Do About It", Mar. 8, 2009, 146 pages.
P. McKenney, "Priority-Boosting RCU Read-Side Critical Sections," LWN.net, Feb. 5, 2007, 15 pages.
P. McKenney et al., "Towards hard realtime response from the Linux kernel on SMP hardware," linux.conf.au, Canberra, Australia, Apr. 2005, 16 pages.
P. McKenney et al., "Exploiting Deferred Destruction: An Analysis of Read-Copy-Update Techniques in Operating System Kernels", Jan. 3, 2005, pp. 1-14.
D. Guniguntala et al., "The read-copy-update mechanism for supporting real-time applications on shared-memory multiprocessor systems with Linux", IBM Systems Journal vol. 47 No. 2, 2008, pp. 221-236.
P. McKenney, "Introducing Technology Into Linux", 2008 Linux Developer Symposium, China, 2008, 47 pages.
P. McKenney, "Simplicity Through Optimization", linux.conf.au, Jan. 2010, 109 pages.
P. McKenney, "Deterministic Synchronization in Multicore Systems: the Role of RCU", Aug. 18, 2009, pp. 1-9.
P. McKenney, "RCU cleanups and simplified preemptable RCU", LKML.org, Jul. 23, 2009, 1 page.
P. McKenney, "Expedited "big hammer" RCU grace periods", LKML.org, Jun. 25, 2009, 2 pages.
P. McKenney, "RCU: The Bloatwatch Edition", LWN.net, Mar. 17, 2009, 9 pages.
M. Desnoyers, "Low-Impact Operating System Tracing", University of Montreal, PhD Thesis, Dec. 2009, 233 pages.
P. McKenney, "Using a Malicious User-Level RCU to Torture RCU-Based Algorithms", linux.conf.au, Jan. 2009, 51 pages.
P. McKenney et al., "Introducing Technology Into the Linux Kernel: A Case Study", Operating Systems Review, Jul. 2008, 16 pages.
P. McKenney, "What is RCU, Fundamentally", LWN.net, Dec. 17, 2007, 15 pages.
P. McKenney, What is RCU? Part 2: Usage, LWN.net, Dec. 24, 2007, 15 pages.
P. McKenney, RCU part 3: the RCU API, LWN.net, Jan. 7, 2008, 7 pages.
T. Hart et al., "Performance of memory reclamation for lockless synchronization", Journal of Parallel and Distributed Computing, Dec. 2007, pp. 1270-1285.
McKenney, "Using Promela and Spin to verify parallel algorithms", LWN.net, Aug. 1, 2007, 11 pages.
McKenney, "RCU and Unloadable Modules", LWN.net, Jan. 14, 2007, 4 pages.
P. Zijlstra, "[Patch] slab: document SLAB_DESTROY_BY_RCU", LKML.org, Nov. 13, 2008, 1 page.
A. Arcangeli et al., "Using Read-Copy-Update Techniques for System V IPC in the Linux 2.5 Kernel," 2003 FREENIX, Jun. 14, 2003, 13 pages.
P. McKenney, "The RCU API, 2010 Edition", LWN.net, Dec. 8, 2010, 11 pages.
M. Desnoyers et al., "User-Level Implementations of Read-Copy Update", IEEE Transactions on Parallel and Distributed Systems, vol. x, No. y, Jul. 2009, pp. 1-14.
J. Triplett, "Scalable Concurrent Hash Tables via Relativistic Programming", ACM-SIGOPS Operating System Review vol. 44, Issue 3, Jul. 2010, 14 pages.
T. Gleixner, High Resolution Timers / Dynamic Tics—V2, LWN.net, Oct. 31, 2006, 5 pages.
D. Brodkowski, "Re: A few questions and issues with dynticks, NOHZ and powertop", Apr. 6, 2010, see <http://linux.derkeiler.com/Mailing-Lists/Kernel/2010-04/msg01380.html>, 4 pages.
IP.com et al.; "Avoiding Unnecessary Wakeups When Waking Up CPUs At the Completion of a Grace Period", IPCOM000216206D, Mar. 25, 2012.
Hornbeck et al., "Power Management in the Linux Kernel", Apr. 7, 2011, pp. 1-31.
McKenney, "Getting RCU Further Out of the Way", 2012 Linux Plumbers Conference, Real Time Microconference, Aug. 31, 2012, 31 pages.
Radovic et al., "Hierarchical Backoff Locks for Nonuniform Communication Architectures", HPCA, 1993 ( 12 pages).
Graunke et al., "Synchronization Algorithms for Shared-Memory Multiprocessors", IEEE Computer, Jun. 1990 (pages).
Mellor-Crummey et al., "Algorithms for Scalable Synchronization on Shared-Memory Multiprocessors", ACM Transactions on Computer Systems, Feb. 1991 (42 pages).
Scott et al., "Scalable Queue-Based Spin Locks with Timeout", PPoPP '01, Jun. 2001 (9 pages).
Abellan et al., "GLocks: Efficient Support for Highly-Contended Locks in Many-Core CMPs", IPDPS IEEE International Parallel & Distributed Processing Smposium, May 16-20, 2011 (pp. 893-905).
Shalev et al., "Predictive Log-Synchronization", ACM EuroSys'06, 18021 Apr. 2006 (pp. 305-315).

* cited by examiner

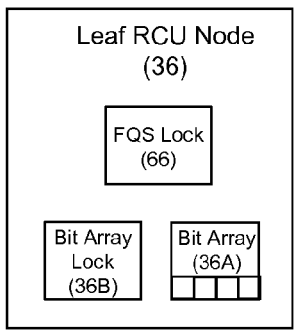
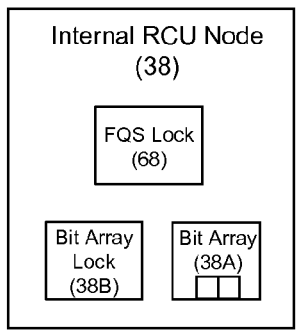
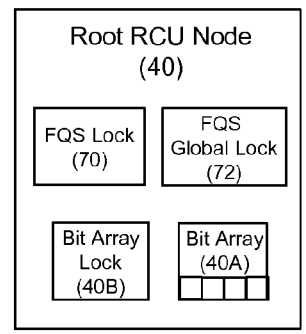
FIG. 7   FIG. 8   FIG. 9
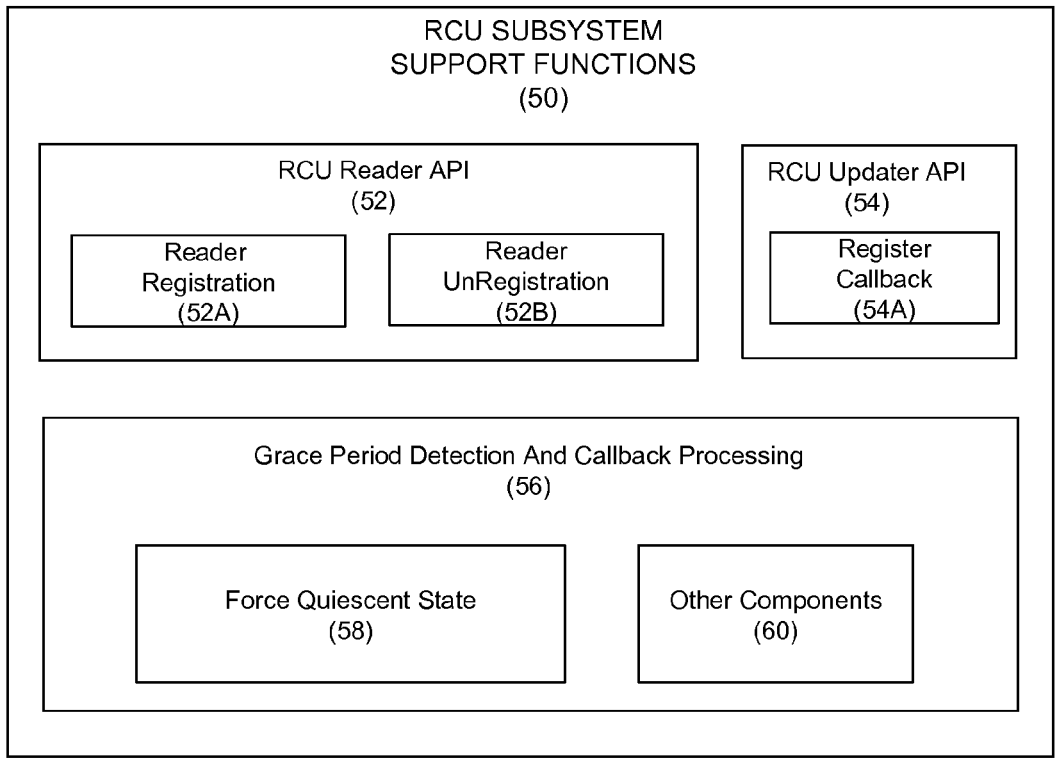
FIG. 10

```
1  static void force_quiescent_state(struct rcu_state *rsp)
2  {
3    unsigned long flags;
4    bool ret;
5    struct rcu_node *rnp;
6    struct rcu_node *rnp_old = NULL;
7
8    local_irq_save(flags);
9    rnp = __this_cpu_ptr(rsp->rda)->mynode;
10   for (; rnp != NULL; rnp = rnp->parent) {
11     ret = (ACCESS_ONCE(rsp->gp_flags) & RCU_GP_FLAG_FQS) ||
12           !raw_spin_trylock(&rnp->fqslock);
13     if (rnp_old != NULL)
14       raw_spin_unlock(&rnp_old->fqslock);
15     if (ret) {
16       rsp->n_force_qs_lh++;
17       local_irq_restore(flags);
18       return;
19     }
20     rnp_old = rnp;
21   }
22   raw_spin_lock(&rnp_old->lock);
23   raw_spin_unlock(&rnp_old->fqslock);
24   if (ACCESS_ONCE(rsp->gp_flags) & RCU_GP_FLAG_FQS) {
25     rsp->n_force_qs_lh++;
26     raw_spin_unlock_irqrestore(&rnp_old->lock, flags);
27     return;
28   }
29   rsp->gp_flags |= RCU_GP_FLAG_FQS;
30   raw_spin_unlock_irqrestore(&rnp_old->lock, flags);
31   wake_up(&rsp->gp_wq);
32 }
```

FIG. 11

```
1   struct tree_lock {
2   spinlock_t try_lock;
3   struct tree_lock *parent;
4   struct tree_lock *root;
5   int failcount;
6   };
7
8   int tree_try_lock(struct tree_lock *leafp,
9                     bool (*check)(void *arg), void *arg)
10  {
11    bool ret;
12    struct tree_lock *tlp;
13    struct tree_lock *tlp_old = NULL;
14
15    for (tlp = leafp; tlp != NULL; tlp = tlp->parent) {
16      ret = check(arg) || !spin_trylock(&tlp->try_lock);
17      if (tlp_old != NULL)
18        spin_unlock(&tlp_old->try_lock);
19      if (ret) {
20        tlp->failcount++;
21        return 0;
22      }
23      tlp_old = tlp;
24    }
25    return 1;
26  }
27
28  void tree_unlock(struct tree_lock *leafp)
29  {
30    struct tree_lock *tlp = leafp->root;
31
32    spin_unlock(&tlp->try_lock);
33  }
```

FIG. 12

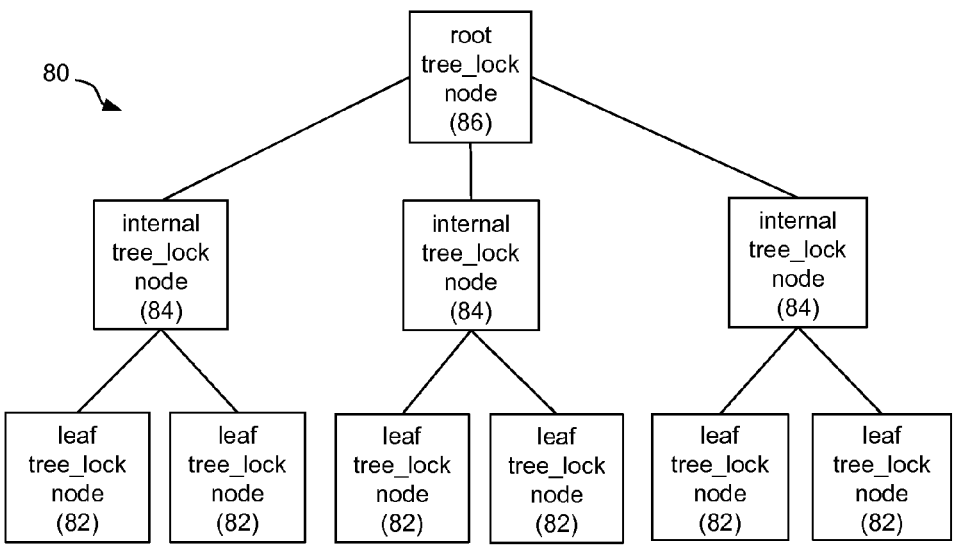

FIG. 13

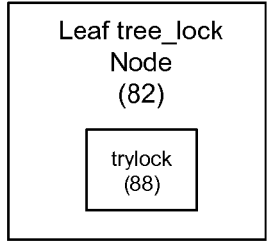
FIG. 14
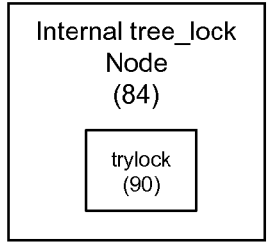
FIG. 15
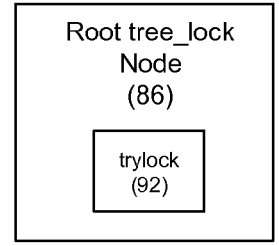
FIG. 16
```
1    #define MY_BIT 0x1
2    int myflag;
3    spinlock_t my_lock;
4
5    struct tree_lock __thread *my_tree_leaf;
6
7    bool my_check(void *my_data)
8    {
9      int *mdp = my_data;
10
11     return !!(*mdp & MY_BIT);
12   }
13
14   void set_my_bit(void)
15   {
16     if (!tree_try_lock(my_tree_leaf, my_check, &myflag))
17       return;
18     spin_lock(&my_lock);
19     tree_unlock(my_tree_leaf);
20     if (myflag & MY_BIT) {
21       spin_unlock(&my_lock);
22       return;
23     }
24     myflag |= MY_BIT;
25     spin_unlock(&my_lock);
26   }
```
FIG. 17

HIGHLY SCALABLE TREE-BASED TRYLOCK

This application is a continuation under 35 U.S.C. 120 of application Ser. No. 13/924,667, filed Jun. 24, 2013, entitled "Highly Scalable Tree-Based Trylock."

BACKGROUND

1. Field

The present disclosure relates to computer systems and methods in which data resources are shared among data consumers while preserving data integrity and consistency relative to each consumer. More particularly, the disclosure concerns a hierarchical locking technique that may be implemented as part of a mutual exclusion mechanism known as "read-copy update," or in other computing environments.

2. Description of the Prior Art

By way of background, read-copy update (also known as "RCU") is a mutual exclusion technique that permits shared data to be accessed for reading without the use of locks, writes to shared memory, memory barriers, atomic instructions, or other computationally expensive synchronization mechanisms, while still permitting the data to be updated (modify, delete, insert, etc.) concurrently. The technique is well suited to both uniprocessor and multiprocessor computing environments wherein the number of read operations (readers) accessing a shared data set is large in comparison to the number of update operations (updaters), and wherein the overhead cost of employing other mutual exclusion techniques (such as locks) for each read operation would be high. By way of example, a network routing table that is updated at most once every few minutes but searched many thousands of times per second is a case where read-side lock acquisition would be quite burdensome.

The read-copy update technique implements data updates in two phases. In the first (initial update) phase, the actual data update is carried out in a manner that temporarily preserves two views of the data being updated. One view is the old (pre-update) data state that is maintained for the benefit of read operations that may have been referencing the data concurrently with the update. The other view is the new (post-update) data state that is seen by operations that access the data following the update. In the second (deferred update) phase, the old data state is removed following a "grace period" that is long enough to ensure that the first group of read operations will no longer maintain references to the pre-update data. The second-phase update operation typically comprises freeing a stale data element to reclaim its memory. In certain RCU implementations, the second-phase update operation may comprise something else, such as changing an operational state according to the first-phase update.

FIGS. 1A-1D illustrate the use of read-copy update to modify a data element B in a group of data elements A, B and C. The data elements A, B, and C are arranged in a singly-linked list that is traversed in acyclic fashion, with each element containing a pointer to a next element in the list (or a NULL pointer for the last element) in addition to storing some item of data. A global pointer (not shown) is assumed to point to data element A, the first member of the list. Persons skilled in the art will appreciate that the data elements A, B and C can be implemented using any of a variety of conventional programming constructs, including but not limited to, data structures defined by C-language "struct" variables. Moreover, the list itself is a type of data structure.

It is assumed that the data element list of FIGS. 1A-1D is traversed (without locking) by multiple readers and occasionally updated by updaters that delete, insert or modify data elements in the list. In FIG. 1A, the data element B is being referenced by a reader r1, as shown by the vertical arrow below the data element. In FIG. 1B, an updater u1 wishes to update the linked list by modifying data element B. Instead of simply updating this data element without regard to the fact that r1 is referencing it (which might crash r1), u1 preserves B while generating an updated version thereof (shown in FIG. 1C as data element B') and inserting it into the linked list. This is done by u1 acquiring an appropriate lock (to exclude other updaters), allocating new memory for B', copying the contents of B to B', modifying B' as needed, updating the pointer from A to B so that it points to B', and releasing the lock. In current versions of the Linux® kernel, pointer updates performed by updaters can be implemented using the rcu_assign_pointer( ) primitive. As an alternative to locking during the update operation, other techniques such as non-blocking synchronization or a designated update thread could be used to serialize data updates. All subsequent (post update) readers that traverse the linked list, such as the reader r2, will see the effect of the update operation by encountering B' as they dereference B's pointer. On the other hand, the old reader r1 will be unaffected because the original version of B and its pointer to C are retained. Although r1 will now be reading stale data, there are many cases where this can be tolerated, such as when data elements track the state of components external to the computer system (e.g., network connectivity) and must tolerate old data because of communication delays. In current versions of the Linux® kernel, pointer dereferences performed by readers can be implemented using the rcu_dereference( ) primitive.

At some subsequent time following the update, r1 will have continued its traversal of the linked list and moved its reference off of B. In addition, there will be a time at which no other reader process is entitled to access B. It is at this point, representing an expiration of the grace period referred to above, that u1 can free B, as shown in FIG. 1D.

FIGS. 2A-2C illustrate the use of read-copy update to delete a data element B in a singly-linked list of data elements A, B and C. As shown in FIG. 2A, a reader r1 is assumed be currently referencing B and an updater u1 wishes to delete B. As shown in FIG. 2B, the updater u1 updates the pointer from A to B so that A now points to C. In this way, r1 is not disturbed but a subsequent reader r2 sees the effect of the deletion. As shown in FIG. 2C, r1 will subsequently move its reference off of B, allowing B to be freed following the expiration of a grace period.

In the context of the read-copy update mechanism, a grace period represents the point at which all running tasks (e.g., processes, threads or other work) having access to a data element guarded by read-copy update have passed through a "quiescent state" in which they can no longer maintain references to the data element, assert locks thereon, or make any assumptions about data element state. By convention, for operating system kernel code paths, a context switch, an idle loop, and user mode execution all represent quiescent states for any given CPU running non-preemptible code (as can other operations that will not be listed here). The reason for this is that a non-preemptible kernel will always complete a particular operation (e.g., servicing a system call while running in process context) prior to a context switch.

In FIG. 3, four tasks 0, 1, 2, and 3 running on four separate CPUs are shown to pass periodically through quiescent states (represented by the double vertical bars). The grace period (shown by the dotted vertical lines) encompasses the time frame in which all four tasks that began before the start of the grace period have passed through one quiescent state. If the four tasks 0, 1, 2, and 3 were reader tasks traversing the linked lists of FIGS. 1A-1D or FIGS. 2A-2C, none of these tasks having reference to the old data element B prior to the grace period could maintain a reference thereto following the grace period. All post grace period searches conducted by these tasks would bypass B by following the updated pointers created by the updater.

Grace periods may be synchronous or asynchronous. According to the synchronous technique, an updater performs the first phase update operation, blocks (waits) until a grace period has completed, and then implements the second phase update operation, such as by removing stale data. According to the asynchronous technique, an updater performs the first phase update operation, specifies the second phase update operation as a callback, then resumes other processing with the knowledge that the callback will eventually be processed at the end of a grace period. Advantageously, callbacks requested by one or more updaters can be batched (e.g., on callback lists) and processed as a group at the end of an asynchronous grace period. This allows asynchronous grace period overhead to be amortized over plural deferred update operations.

More recently, RCU grace period processing has been adapted to account for processor low power states (such as, on Intel® processors, the C1E halt state, or the C2 or deeper halt states). Operating systems can take advantage of low power state capabilities by using mechanisms that withhold regular timer interrupts from processors (in a low power state) unless the processors need to wake up to perform work. The dynamic tick framework (also called "dyntick" or "nohz") in existing versions of the Linux® kernel is one such mechanism. In RCU implementations designed for low power applications in the Linux® kernel, a compiler configuration option called RCU_FAST_NO_HZ is available. This option allows processors to be placed in low power states even if there are pending RCU callbacks, provided none require immediate invocation and the processor is not needed for grace period advancement processing.

One characteristic of the RCU_FAST_NO_HZ option is that quiescent states are periodically forced in order to expedite callback processing so that processors can enter low power states more quickly. Quiescent state forcing is regulated by a global lock that serializes access to the quiescent state forcing mechanism. The global quiescent state forcing lock is acquired only with a trylock primitive called "raw_spin_trylock_irqsave( )" which either immediately acquires the lock or returns failure. As such, the contention on the global quiescent state forcing lock should be zero. Unfortunately, on large systems (thousands of CPUs), enabling RCU_ FAST_NO_HZ has historically been susceptible to extreme memory contention due to a high rate of attempts to acquire the global quiescent state forcing lock, resulting in throughput dropping to nearly zero. This high level of memory contention can also result from RCU's implementation of the asynchronous callback processing primitive "call_rcu( )" which can invoke quiescent state forcing when large numbers of RCU callbacks are enqueued on the CPU in question.

Although an immediate solution is to disable RCU_FAST_NO_HZ on large systems, this approach results in sub-optimal energy efficiency. Accordingly, there is a need for a technique for acquiring the global quiescent state forcing lock with reduced memory contention. Other RCU operations, as well as many non-RCU operations, could likewise benefit from a locking technique with reduced lock contention in systems with many processors.

SUMMARY

A method, system and computer program product are provided to implement tree-based trylock operations that reduce contention on a root trylock in a computer system having two or more processors operatively coupled to one or more memory devices. In an example embodiment, a lock hierarchy is provided in which plural trylocks are distributed among nodes of a tree-based node structure having a plurality of leaf nodes, one or more internal nodes, and a root node. The processors are assigned to the leaf nodes in a distributed and balanced manner in order to minimize memory contention on the trylocks. A trylock acquisition operation is implemented on a selected one of the processors for acquiring a root trylock associated with the root node. The trylock acquisition operation attempts to acquire one of the trylocks at each node of the node structure that lies on a traversal path beginning at one of the leaf nodes, passing through one or more of the internal nodes, and ending at the root node. The trylock acquisition operation succeeds if each trylock on the traversal path is acquired, and fails if any trylock on the traversal path cannot be acquired. A trylock housekeeping operation releases all non-root trylocks visited by the trylock acquisition operation, such that if the trylock acquisition operation succeeds, only the root trylock will remain acquired at the end of the operation, and if the trylock acquisition operation fails, none of the trylocks will be remain acquired at the end of the operation.

In an example embodiment, the root trylock guards a guarded operation for which duplicate initiations are redundant, or guards a global lock that in turn guards the guarded operation.

In an example embodiment, the guarded operation comprises read-copy update quiescent state forcing.

In an example embodiment, the trylock acquisition operation further includes checking, at each node on the traversal path, a condition indicating that an operation protected by the root trylock has already been initiated by another one of the processors, and failing the trylock acquisition operation if the condition exists.

In an example embodiment, the trylock housekeeping operation is performed at each of the nodes on the traversal path by releasing a trylock acquired at an immediately preceding node.

In an example embodiment, a global lock acquisition is performed to acquire a global lock after the trylock acquisition operation successfully acquires the root trylock, the root trylock being released if the global lock acquisition is successful.

In an example embodiment, the global lock acquisition operation includes checking a condition indicating that an operation guarded by the global lock has already been initiated by another one of the processors, and failing the global lock acquisition operation if the condition exists.

BRIEF DESCRIPTION OF THE DRAWINGS

The foregoing and other features and advantages will be apparent from the following more particular description of example embodiments, as illustrated in the accompanying Drawings, in which:

FIG. 7 is a functional block diagram showing components of a leaf RCU node in the RCU node hierarchy of FIG. 6;

FIG. 8 is a functional block diagram showing components of an internal RCU node in the RCU node hierarchy of FIG. 6;

FIG. 9 is a functional block diagram showing components of a root RCU node in the RCU node hierarchy of FIG. 6;

FIG. 10 is a functional block diagram showing a set of RCU subsystem support functions that be provided by the RCU subsystem of FIG. 5;

FIG. 11 illustrates example C-language code for an RCU force_quiescent_state( ) function that may be implemented in accordance with the present disclosure;

FIG. 12 illustrates example C-language code for implementing a hierarchy of tree_lock nodes that each contain a trylock, and for implementing a tree_try_lock( ) function, and for implementing a tree_unlock function;

FIG. 13 is a functional block diagram showing an example implementation of the hierarchy of tree_lock nodes that each contain a trylock, as defined in the example code of FIG. 12;

FIG. 14 is a functional block diagram showing components of a leaf tree_lock node in the node hierarchy of FIG. 13;

FIG. 15 is a functional block diagram showing components of an internal tree_lock node in the node hierarchy of FIG. 13;

FIG. 16 is a functional block diagram showing components of a root tree_lock node in the node hierarchy of FIG. 13;

FIG. 17 illustrates example C-language code for using the tree_try_lock( ) and tree_unlock( ) functions of FIG. 12;

DETAILED DESCRIPTION OF EXAMPLE EMBODIMENTS

Introduction

The present disclosure provides a hierarchy of conditional trylocks, with a trylock at each node of the hierarchy, including a root trylock at the root node of the hierarchy that guards an operation for which duplicate initiations are redundant, or which indirectly guards the operation by guarding a global lock that directly guards the operation. One example of such an operation is quiescent state forcing, as described in the Background section above. In order to reduce contention on the root trylock, each CPU (or thread) is assigned to one of the leaf nodes and conditionally acquires a trylock at each level of the hierarchy in an at-most once manner, beginning at its assigned leaf node and moving upwardly through the hierarchy in leaf-to-root fashion.

To conditionally acquire a given trylock, a CPU/thread asserts the trylock and immediately checks the result. If the acquisition fails, the overall acquisition fails. Otherwise, if the acquisition succeeds, the CPU/thread moves up to the next level of the hierarchy and repeats. Regardless whether the root trylock acquisition effort succeeds or fails at some point along the node traversal path, all non-root trylocks must be released. Releasing these lower level trylocks may be efficiently handled by the CPU/thread at each node as it moves upwardly through the lock hierarchy. In particular, after (or before) the CPU/thread attempts to acquire a trylock at a given level of the hierarchy, it may release the prior trylock acquired in the immediately preceding level. Other trylock release methods may also be used.

If the CPU/thread acquires the trylock at the root of the hierarchy, it has acquired the root trylock. Additionally, a global lock that protects a particular operation may be provided as a separate lock that is acquired by the CPU/thread after it acquires the root trylock. In the example embodiment in which the operation in question is RCU quiescent state forcing, such an additional global lock is used because it already exists in RCU implementations for the Linux® kernel. The purpose of the global lock is to synchronize setting of a flag and a wakeup to the quiescent state forcing operation protected by the lock. In this embodiment, additional efficiency may be obtained by checking the flag at each level of the hierarchy. If the flag is already set, then a quiescent state forcing operation has already been requested and there is no need to push further up the hierarchy. Other embodiments may likewise use this technique, checking the state of a flag (or other condition indicator) as the lock hierarchy is traversed in order to avoid wasted effort.

Example Embodiments

Figure 1A:
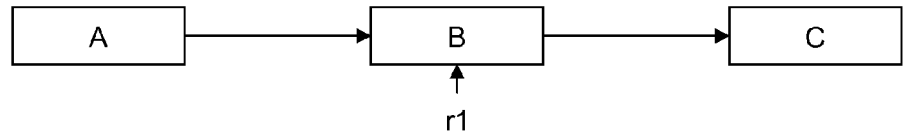
FIGS. 1A-1D are diagrammatic representations of a linked list of data elements undergoing a data element replacement according to a conventional read-copy update mechanism.
Figure 1B:
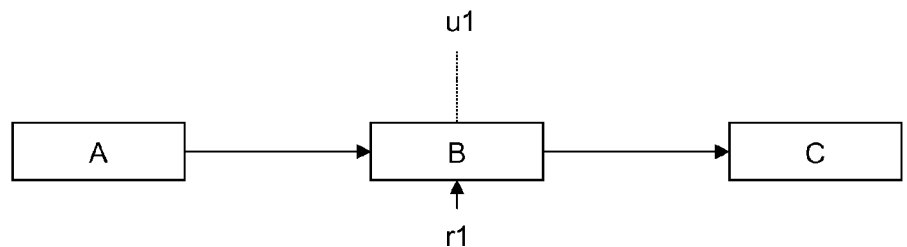
Figure 1C:
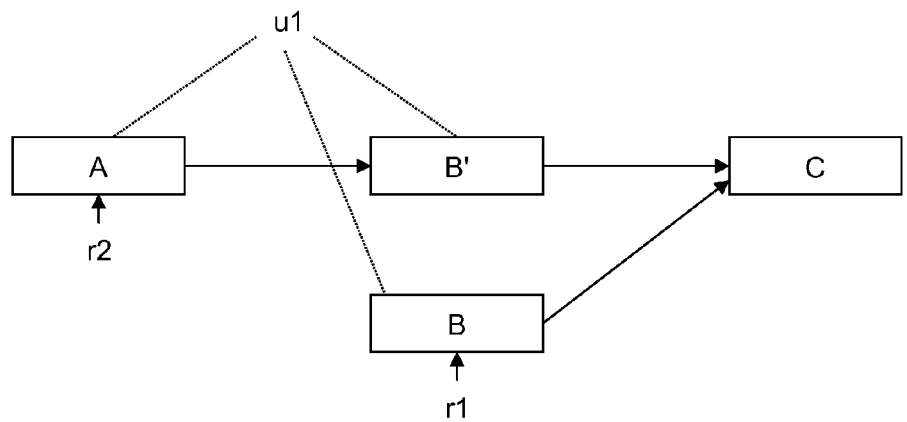
Figure 1D:
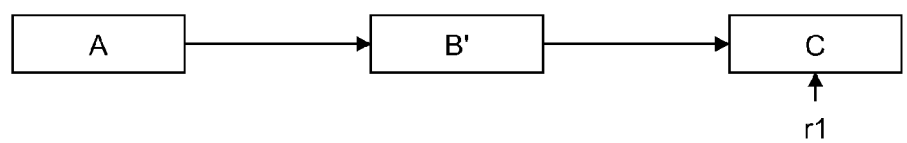
Figure 2A:
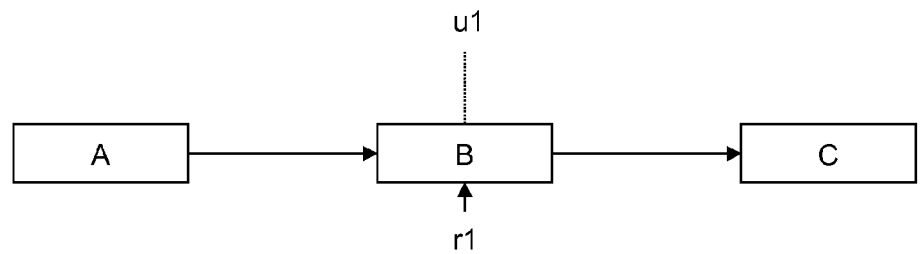
FIGS. 2A-2C are diagrammatic representations of a linked list of data elements undergoing a data element deletion according to a conventional read-copy update mechanism.
Figure 2B:
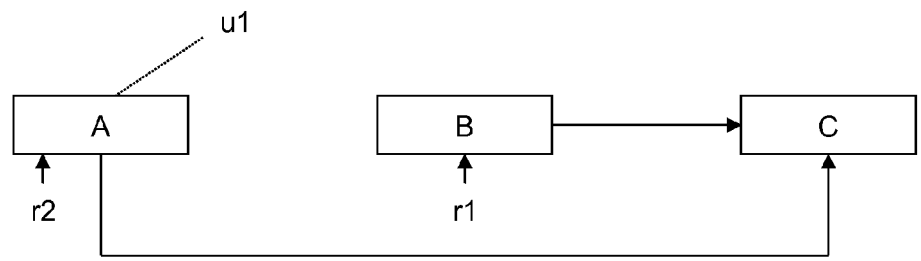
Figure 2C:
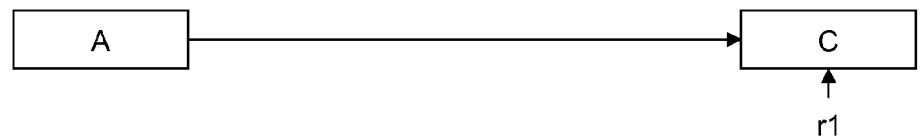
Figure 3:
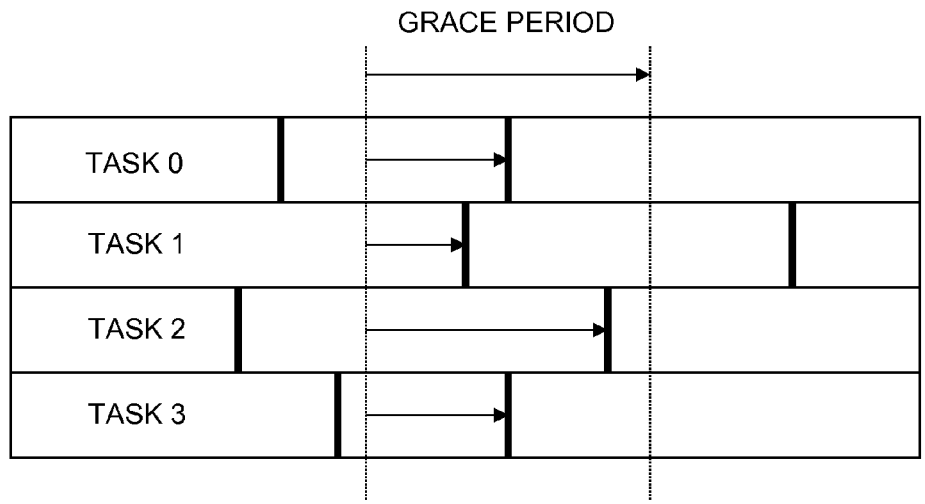
FIG. 3 is a flow diagram illustrating a grace period in which four processes pass through a quiescent state.
Figure 4:
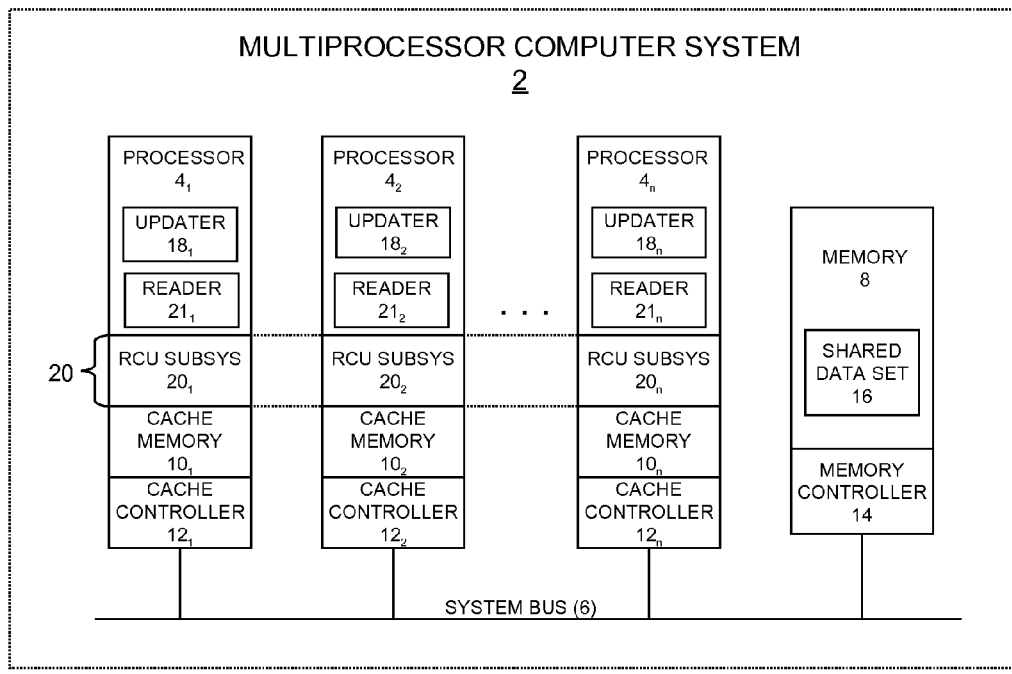
FIG. 4 is a functional block diagram showing a multiprocessor computing system that may be implemented in accordance with the present disclosure.

Turning now to the figures, wherein like reference numerals represent like elements in all of the several views, FIG. 4 illustrates an example multiprocessor computer system in which the grace period processing technique described herein may be implemented. In FIG. 4, a computer system 2 includes multiple processors $4_1$, $4_2$ ... $4_n$, a system bus 6, and a program memory 8. There are also cache memories $10_1$, $10_2$ ... $10_n$ and cache controllers $12_1$, $12_2$ ... $12_n$ respectively associated with the processors $4_1$, $4_2$ ... $4_n$. A conventional memory controller 14 is again associated with the memory 8. As shown, the memory controller 14 may reside separately from processors $4_2$ ... $4_n$ (e.g., as part of a chipset).

The computer system 2 may represent any of several different types of computing apparatus. Such computing apparatus may include, but are not limited to, general purpose computers, special purpose computers, portable computing devices, communication and/or media player devices, set-top devices, embedded systems, and other types of information handling machines. The term "processor" as used with reference to the processors $4_1$, $4_2$ ... $4_n$ encompasses any program execution unit capable of executing program instructions, including but not limited to a packaged integrated circuit device (such as a microprocessor), a processing core within a packaged integrated circuit device (such as a microprocessor core), or a hardware thread comprising one or more functional units within a processing core (such as an SMT thread). Each such execution unit may be referred to as a CPU (central processing unit). The processors $4_1$, $4_2$ ... $4_n$ may be situated within a single computing device or node (e.g., as part of a single-node SMP system) or they may be distributed over plural nodes (e.g., as part of a NUMA system, a cluster, or a cloud). The memory 8 may comprise any type of tangible storage medium capable of storing data in computer readable form for use in program execution, including but not limited to, any of various types of random access memory (RAM), various flavors of programmable read-only memory (PROM) (such as flash memory), and other types of primary storage (i.e., program memory). The cache memories $10_1, 10_2 \ldots 10_n$ may be implemented in several levels (e.g., as level 1, level 2 and level 3 caches) and the cache controllers $12_1, 12_2 \ldots 12_n$ may collectively represent the cache controller logic that supports each cache level. As illustrated, the memory controller 14 may reside separately from processors $4_1, 4_2 \ldots 4_n$, for example, as part of a discrete chipset. Alternatively, the memory controller 14 could be provided by plural memory controller instances that are respectively integrated with the processors $4_1, 4_2 \ldots 4_n$.

Each CPU embodied by a given processor 4 is operable to execute program instruction logic under the control of a software program stored in the memory 8 (or elsewhere). As part of this program execution logic, update operations (updaters) 18 may execute within a process, thread, or other execution context (hereinafter "task") on any of the processors 4. Each updater 18 runs periodically to perform updates on a set of shared data 16 that may be stored in the shared memory 8 (or elsewhere). In FIG. 4, reference numerals $18_1, 18_2 \ldots 18_n$ illustrate individual data updaters that respectively execute on the several processors $4_1, 4_2 \ldots 4_n$. As described in the "Background" section above, the updates performed by an RCU updater can include modifying elements of a linked list, inserting new elements into the list, deleting elements from the list, and other types of operations. To facilitate such updates, the processors 4 may be programmed from instructions stored in the memory 8 (or elsewhere) to implement a read-copy update (RCU) subsystem 20 as part of their processor functions. In FIG. 4, reference numbers $20_1, 20_2 \ldots 20_n$ represent individual RCU instances that may periodically execute on the several processors $4_1, 4_2 \ldots 4_n$. Any given processor 4 may also execute a read operation (reader) 21. Each reader 21 runs from program instructions stored in the memory 8 (or elsewhere) in order to periodically perform read operations on the set of shared data 16 stored in the shared memory 8 (or elsewhere). In FIG. 4, reference numerals $21_1, 21_2 \ldots 21_n$ illustrate individual reader instances that may respectively execute on the several processors $4_1, 4_2 \ldots 4_n$. Such read operations will typically be performed far more often than updates, this being one of the premises underlying the use of read-copy update. Moreover, it is possible for several of the readers 21 to maintain simultaneous references to one of the shared data elements 16 while an updater 18 updates the same data element.

During operation of the computer system 2, an updater 18 will occasionally perform an update to one of the shared data elements 16. In accordance the philosophy of RCU, a first-phase update may be performed in a manner that temporarily preserves a pre-update view of the shared data element for the benefit of readers 21 that may be concurrently referencing the shared data element during the update operation. Following the first-phase update, the updater 18 may register a callback with the RCU subsystem 20 for the deferred destruction of the pre-update view following a grace period (second-phase update). As described in the "Background" section above, this is known as asynchronous grace period processing. Alternatively, the updater 18 may request a synchronous expedited grace period.

The grace period processing performed by the RCU subsystem 20 entails starting new grace periods and detecting the end of old grace periods so that the RCU subsystem 20 knows when it is safe to free stale data (or take other actions). Grace period processing may further entail the management of callback lists that accumulate callbacks until they are ripe for batch processing at the end of a given grace period.

Figure 5:
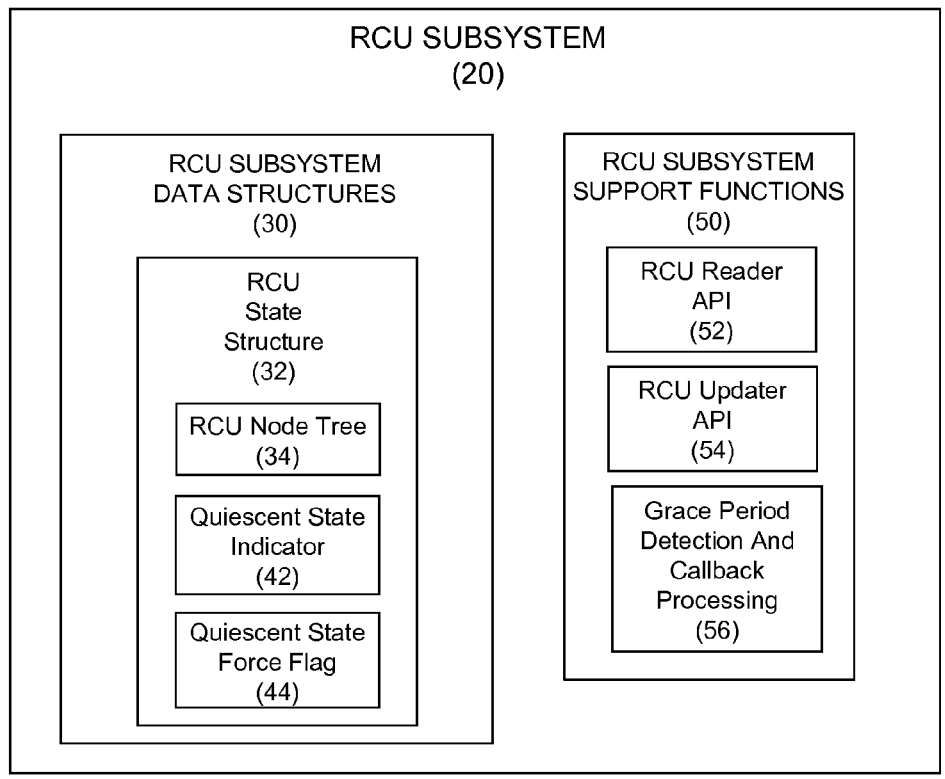
FIG. 5 is a functional block diagram showing an RCU subsystem that may be provided in the computer system of FIG. 4.
Figure 6:
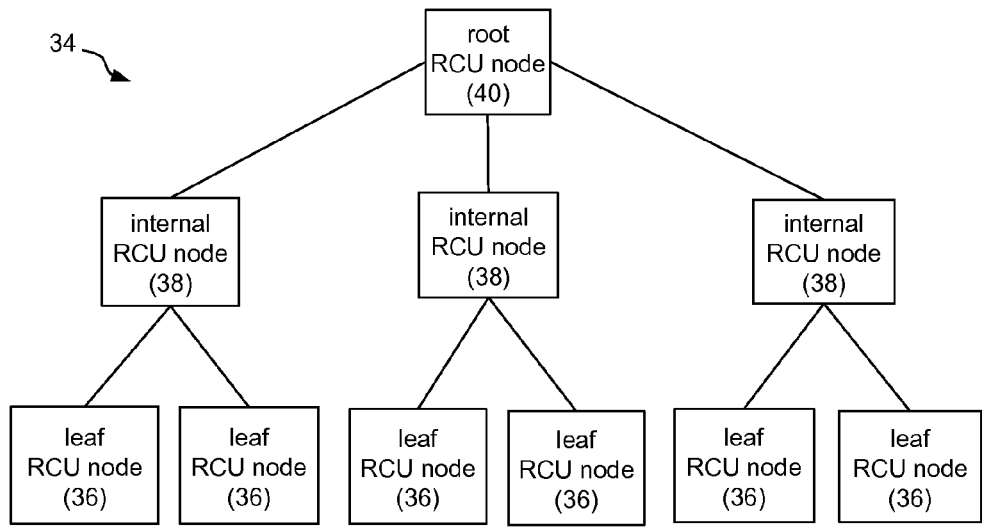
FIG. 6 is a functional block diagram showing an example RCU node hierarchy that may be implemented in accordance with the present disclosure.

Turning now to FIG. 5, example components of the RCU subsystem 20 are shown. Among these components is a set of RCU subsystem data structures 30 that includes an RCU state structure 32 for tracking per-processor quiescent states. For purposes of the present embodiment, it may be assumed that the RCU subsystem 20 is configured as a hierarchical RCU implementation, as is conventionally provided in large multiprocessor computer systems running the Linux® kernel. In that case, the RCU subsystem data structures 30 will further include a tree 34 of RCU nodes embedded as a linear array within the RCU state structure 32. FIG. 6 illustrates an example three-level RCU node tree that includes six bottom-level leaf RCU nodes 36, three intermediate level internal RCU nodes 38, a top level root RCU node 40.

In addition to the embedded RCU node tree 34, the RCU state structure 32 includes a quiescent state indicator 42 for indicating when all of the processors 4 have passed through a quiescent state and a grace period may be ended. The RCU state structure 32 also includes a quiescent state force flag 44 to indicate that a quiescent state forcing operation has been requested by one of the processors 4.

One of the purposes of the RCU node tree 34 is to reduce contention for the quiescent state indicator 42, which could be problematic if the indicator was protected by a single global lock. See P. McKenney, Hierarchical RCU, <lwn.net/Articles/305782>, Nov. 4, 2008. Instead of all the processors 4 using a global lock to access the quiescent state indicator 42, subsets of the processors are assigned to individual leaf RCU nodes 36. Similarly, subsets of the leaf RCU nodes 36 are assigned to individual internal RCU nodes 38. The internal RCU nodes 38 are likewise assigned to the root RCU node 40. As shown in FIG. 7, each leaf RCU node 36 maintains an array 36A of quiescent state bits, with each bit corresponding to one of the leaf node's assigned processors. By way of example, FIG. 7 shows four quiescent state bits associated with four of the processors 4. A bit array lock 36B serializes access to the quiescent state bit array 36A. Similarly, each internal RCU node 38 maintains an array 38A of quiescent state bits, with each bit corresponding to one of the internal node's assigned RCU leaf nodes 36. A bit array lock 38B serializes access to the quiescent state bit array 38A. The root RCU node 40 maintains an array 40A of quiescent state bits to which the internal RCU nodes 38 are respectively assigned. A bit array lock 40B serializes access to the quiescent state bit array 40A.

When a processor 4 passes through a quiescent state, it asserts the RCU node lock 36B in its assigned leaf RCU node 36, and sets its assigned quiescent state bit in the bit array 36A. To propagate the quiescent state information upwardly through the RCU node tree 34, the last processor 4 to set its bit in a leaf RCU node 36 acquires the RCU node lock 38B in the internal RCU node 38 to which the leaf node is assigned, and sets the internal node's quiescent state bit in the bit array 38A. In similar fashion, the last processor 4 to set a bit in an internal RCU node 38 acquires the RCU node lock 40B in the root RCU node 40, and sets the root node's quiescent state bit in the bit array 40A. Finally, the last processor 4 to set a bit in the root node bit array 40A accesses and sets the quiescent state indicator 42, thereby signaling that the current RCU grace period may end.

It should be noted that a production read-copy update implementation will typically include many additional data structures that are not shown in FIG. 5. A discussion of such data structures is omitted for ease of description and in order to focus attention on the tree-based trylock technique disclosed herein. As will be described in more detail below, the RCU node tree 34 may be conveniently used to provide a hierarchical tree structure for the new trylock technique. Other hierarchical trees may be used in other implementations.

Returning now to FIG. 5, the components of the RCU subsystem 20 also include several RCU subsystem support functions 50, namely, an RCU reader API (Application Programming Interface) 52, an RCU updater API 54, and a set of grace period detection and callback functions 56.

As shown in FIG. 10, the RCU reader API 52 comprises a reader registration component 52A and a reader unregistration component 52B. These components are respectively invoked by readers 21 as they enter and leave their RCU read-side critical sections. This allows the RCU subsystem 20 to track reader operations and determine when readers are engaged in RCU-protected read-side critical section processing. In an example embodiment, the reader registration component 52A and the reader unregistration component 52B may be respectively implemented using the rcu_read_lock( ) and rcu_read_unlock( ) primitives found in existing read-copy update implementations.

As also shown in FIG. 10, the RCU updater API 54 comprises a register callback component 54A. The register callback component 54A is used by updaters 18 to register a callback following a first-phase update to a shared data element 16. An invocation of the register callback component 54A initiates processing that places the callback on one of the RCU callback lists 34 associated with the processor 4 that runs the updater 18. This may start an asynchronous grace period (if one is not already underway) so that the callback can be processed after the grace period has ended as part of second-phase update processing to remove stale data (or perform other actions). In an example embodiment, the register callback component 54A may be implemented using the existing call_rcu( ) primitive found in conventional read-copy update implementations.

With continuing reference to FIG. 10, the grace period detection and callback processing component 56 of the RCU subsystem 20 include a force quiescent state component 58 that implements the tree-based trylock technique disclosed herein. The grace period detection and callback processing component 56 also includes a number of other conventional RCU components 64 that are responsible for various operations, such as starting new grace periods, detecting the end of old grace periods, and processing callbacks as grace periods end. A discussion of such components is omitted for ease of description and in order to focus attention on the tree-based trylock technique disclosed herein.

As described in the Introduction section above, the tree-based trylock technique disclosed herein contemplates a hierarchical tree of nodes, with a trylock at each node, and including a root trylock at the root node of the hierarchy. As is known in the art, a trylock is a lock having at-most-once semantics, such that lock acquisition is tried only once and either succeeds or fails. The processors 4 are assigned to different leaf nodes in a distributed and balanced manner in order to minimize memory contention. A CPU or a thread running within a CPU that desires to acquire the root trylock begins at one of the leaf nodes of the lock hierarchy, and works its way to the root trylock node following a traversal path, conditionally acquiring trylocks at lower level nodes as it does so, and releasing all trylocks and abandoning the acquisition effort if it fails to acquire a trylock at any given level. As stated above, in a hierarchical RCU implementation as described above in connection FIGS. 5-9, the RCU nodes 36, 38 and 40 of the RCU node hierarchy 34 provide convenient data structures for holding the tree-based trylocks contemplated by the present disclosure. Such tree-based trylocks are shown in the RCU node diagrams of FIGS. 7, 8 and 9, and are identified as force quiescent state (FQS) locks insofar as the present embodiment uses the trylocks to serialize access to the quiescent state force flag 44 shown in FIG. 5. In FIG. 7, the leaf RCU node 36 is shown as having a force quiescent state trylock 66. In FIG. 8, the internal RCU node 38 is shown as having a force quiescent state trylock 68. In FIG. 9, the root RCU node 40 is shown as having a root force quiescent state trylock 70. In addition, the root RCU node 40 includes a global force quiescent state lock 72 (which may or may not be a trylock), that protects access to the quiescent state force indicator 44.

With reference now to FIG. 11, example C-language pseudocode that may be used to implement the force quiescent state component 58 is shown. The function name given to the quiescent state component 58 is "force_quiescent_state( )" The argument to this function is a pointer "*rsp" to the RCU state structure 32 shown in FIG. 5. The purpose of the function is to set the quiescent state force flag 44, which is given the name "GP_FLAGS_FQS" in the code, and is implemented as a bit in flags field of the RCU state structure 32 called "rsp->gp_flags." Line 8 of the code disables interrupts in order to pin the current task onto a particular CPU, allowing line 9 to obtain a stable reference to this CPU's leaf RCU node 36 (named "rnp"). As an alternative, it is possible to take a snapshot of the CPU number without disabling interrupts. This alternative approach risks additional cache misses, but provides better scheduling latency. Moreover, a user-level implementation of the disclosed tree-based trylock technique would normally be incapable of disabling interrupts.

The loop spanning lines 10-21 traverses the RCU node tree 34 (see FIG. 6) from leaf to root. Line 11 checks the quiescent state flag 44 to see if another task already performed the required work, and if not, line 12 attempts to acquire the current RCU node's force quiescent state trylock (see elements 66, 68 and 70 of FIGS. 7, 8 and 9, respectively), referred to in the code as "fqslock." To expedite the memory access, each force quiescent state trylock 66, 68 or 70 may be aligned to its own cache line. The Boolean result of lines 11 and 12 is stored in the "ret" variable. If line 13 determines that a trylock acquired during the previous pass through the loop is still being held, line 14 releases it using the tree unlock component 62 of FIG. 10. Line 15 tests the "ret" variable. If the line 11 determined that the quiescent state force flag 44 is already set, or if the attempt on line 12 to acquire the force quiescent state trylock 66, 68 or 70 failed, line 16 increments a statistical counter (which can lose counts), line 17 re-enables interrupts, and line 18 returns to the caller. Otherwise, line 20 prepares for the next pass through the loop.

Upon exit from the loop, the root RCU node 40 will have been reached and the root force quiescent state trylock 70 will have been acquired. Line 22 unconditionally acquires the RCU node's global force quiescent state lock 72, whose name in the code is simply "lock." Line 23 releases the root force quiescent state lock 70 using the tree unlock component 62 of FIG. 10. Line 24 optionally makes one final check of the quiescent state force flag 44 to see if it is already set by another task, and if so, lines 25-27 increment the statistical counter, release the root RCU node's global force quiescent state lock 72, and return to the caller. Otherwise, line 29 sets the quiescent state force flag 44, line 30 releases the root RCU node's global force quiescent state lock 72, and line 31 wakes up a thread that attempts to force quiescent states in order to end the current grace period.

It is possible to abstract the forgoing tree-based trylock operations for use in other environments, it being understood that the RCU force quiescent state scenario described above is merely on example embodiment of the disclosed subject matter. More generally, any case where a large number of CPUs might need to awaken or otherwise signal a specific CPU/thread to perform an operation with at-most-once semantics can use the disclosed mechanism. This sort of arrangement offers cache-locality advantages (and also a reduction in synchronization overhead) in cases where a specific type of processing can be guaranteed to never consume more than one CPU's worth of processing.

FIGS. 12-16 illustrate one example abstraction of the tree-based trylock operations performed by the force_quiescent_state( ) function of FIG. 11 (which in turn is an example implementation of the force quiescent state component 58 of FIG. 10).

The first few lines of FIG. 12 illustrates an abstract "tree_lock" node that is analogous to the RCU nodes 36, 38 and 40 of the RCU node tree 34 of FIG. 6. FIG. 12 also illustrates an abstract "tree_try_lock( )" function that is analogous to the loop spanning lines 9-21 of the force_quiescent_state( ) function in FIG. 11. As previously described, this loop attempts to acquire the root RCU node's force quiescent state trylock 70 shown in FIG. 9. FIG. 12 likewise illustrates an abstract "tree_unlock( )" function that is analogous to the "raw_spin_unlock( )" function on line 23 in FIG. 11 that unlocks the root RCU node's force quiescent state trylock 70.

Lines 1-6 of FIG. 12 show the structure of the aforementioned "tree_lock" node. A set of tree_lock nodes is arranged hierarchically in a tree of such nodes (a "tree_lock tree"), one example of which is shown by reference number 80 in FIG. 13. The tree_lock tree 80 includes a set of leaf tree_lock nodes 82, a set of internal tree_lock nodes 84 and a top level root tree_lock node 86. As shown in line 2 of FIG. 12, each of the tree_lock nodes 82, 84 and 86 contains a trylock that is named "try_lock." As shown in FIG. 14, the trylock in the leaf tree_lock nodes 82 is identified by reference number 88, the trylock in the internal tree_lock nodes 84 is identified by reference number 90, and the trylock in the root tree_lock node 82 is identified by reference number 92 (the root trylock). As shown in line 3, each of the tree_lock nodes 82, 84 and 86 also contains a reference to the node's immediate parent, with the root node's→parent field being NULL. As shown in line 4, each of the lower level tree_lock nodes 82 and 84 also contains a reference to the root tree_lock node 86, as does the root tree_lock node itself. As shown in line 5, each of the tree_lock nodes 82, 84 and 86, may optionally contain a "failcount" field. This field is used as a failure counter that is analogous to the statistics counter used in lines 16 and 25 of FIG. 11, except that it is maintained on a per-node basis rather than globally as in FIG. 11. The procedures to initialize the full tree_lock tree 80 and to point threads at their respective leaf nodes are straightforward tasks that will not be belabored here.

The tree_try_lock( ) function shown on lines 8-26 of FIG. 12 traverses the tree_lock tree 80 in an effort to acquire the root trylock 92. The "*check( )" function pointer passed as an argument in line 9 is analogous to the check in line 11 of the force_quiescent_state( ) function of FIG. 11 to determine if a flag or other variable guarded by the root lock being acquired is already set. The check( ) function takes *arg as its sole parameter. The loop spanning lines 15-24 traverses the tree_lock tree 80 from leaf to root, starting with a specified leaf tree_lock node 82 passed as an argument to the tree_try_lock( ) function. Line 16 sets local variable "ret" to true if either the check( ) function determines that the required work is already done or the "spin_trylock( )" function fails to acquire the current tree_lock node's trylock (88, 90 or 92), either of which will terminate the traversal up the tree_lock tree 80. Lines 17 and 18 release the trylock acquired (if any) during the previous pass through the loop. Line 20 increments this node's failure counter and line 21 returns to the caller to indicate failure. Otherwise, line 23 prepares for the next pass through the loop. If these operations succeed in locking the root trylock 92, line 25 reports success to the caller. Lines 28-33 show the tree_unlock( ) function, which must be called after the tree_try_lock( ) function reports success. This function simply releases the root trylock 92.

An example usage of the tree-based try lock technique of FIGS. 12-16 is shown in FIG. 17. Line 2 of FIG. 17 declares the variable protected by the root trylock 92 (a flag variable called "myflag" that is analogous to the gp_flags variable checked in lines 11, 24 and 29 of FIG. 11). Line 1 defines the value to which myflag is be set in order to initiate some operation for which duplicate initiations are redundant. This value is defined as a flag called "MY_BIT" that has magnitude of 0x1. The MY_BIT value is analogous to the RCU_GP_FLAG_FQS value checked in lines 11, 24 and 29 of FIG. 11. Line 3 of FIG. 17 declares a global lock called "my_lock" that protects the myflag variable. This global lock could be located anywhere in memory, including in the root tree_lock node 86 if desired. Optionally, the global lock could be eliminated and the root trylock 92 could be used exclusively to guard the myflag variable.

FIG. 17 also illustrates an abstract "my_check( )" function and a "set_my_bit( )" function. The my_check( ) function is defined in lines 7-12. This is the check( ) function that is passed as an argument to tree_try_lock( ) function, as discussed above in connection with FIG. 12. Its purpose is to check if the variable protected by the global mylock (in this case the myflag variable) has already been set to the desired value (in this case the MY_BIT flag). The set_my_bit( ) function is defined in lines 14-26. This function uses the tree_try_lock( ) and tree_unlock( ) functions of FIG. 12 to set the MY_BIT flag in the myflag variable. Line 16 invokes tree_try_lock( ) and line 17 returns if it fails (indicating that the root trylock 92 could not be acquired, or that the required work was already done by another task). Line 18 acquires the global mylock that protects the myflag variable, and line 19 invokes tree_unlock( ) to release the root trylock 92. Note that the call to tree_unlock( ) may be deferred to follow line 25 if reducing memory contention on the global mylock is more important than acquisition latency on this lock. In fact, the call to tree_unlock( ) could be placed anywhere between its current position and line 26. Lines 20-23 do one last check to see if the MY_BIT flag has already been set in the myflag variable. Note that these lines may be omitted if memory contention on the myflag variable is not a concern. Line 24 sets MY_BIT, and could be optionally followed by code that awakens some other thread or process to perform a desired operation. Finally, line 25 releases the global mylock.

The code of FIGS. 12-17 shows how the disclosed tree-based trylock technique may be used to efficiently and scalably provide the "do-at-most-once" semantics that are required for posting new work to a thread that implements an operation for which duplicate initiations are redundant.

Figure 18:
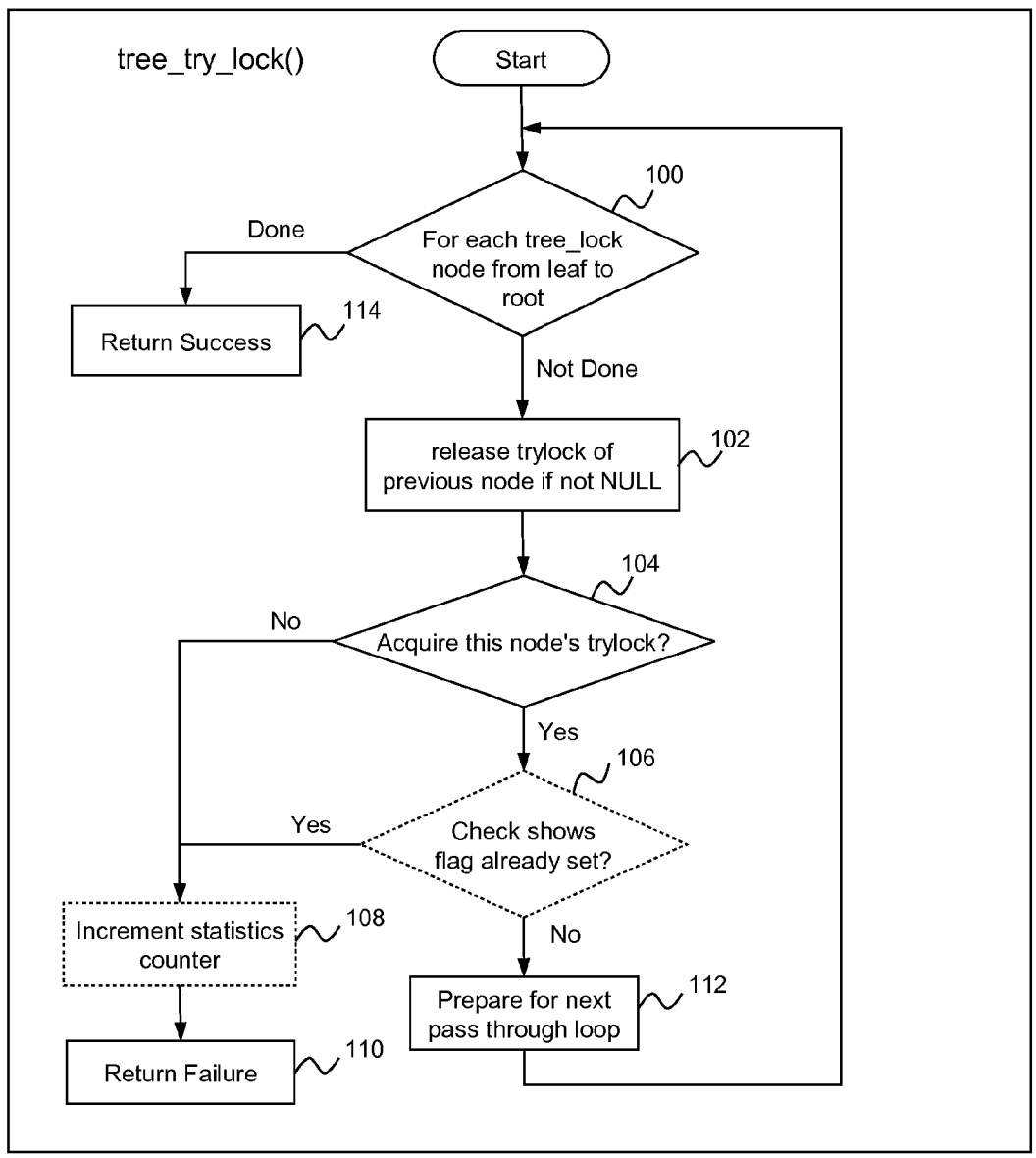
FIG. 18 is a flow diagram showing example operations of the tree_try_lock( ) function of FIG. 12.
Figure 19:
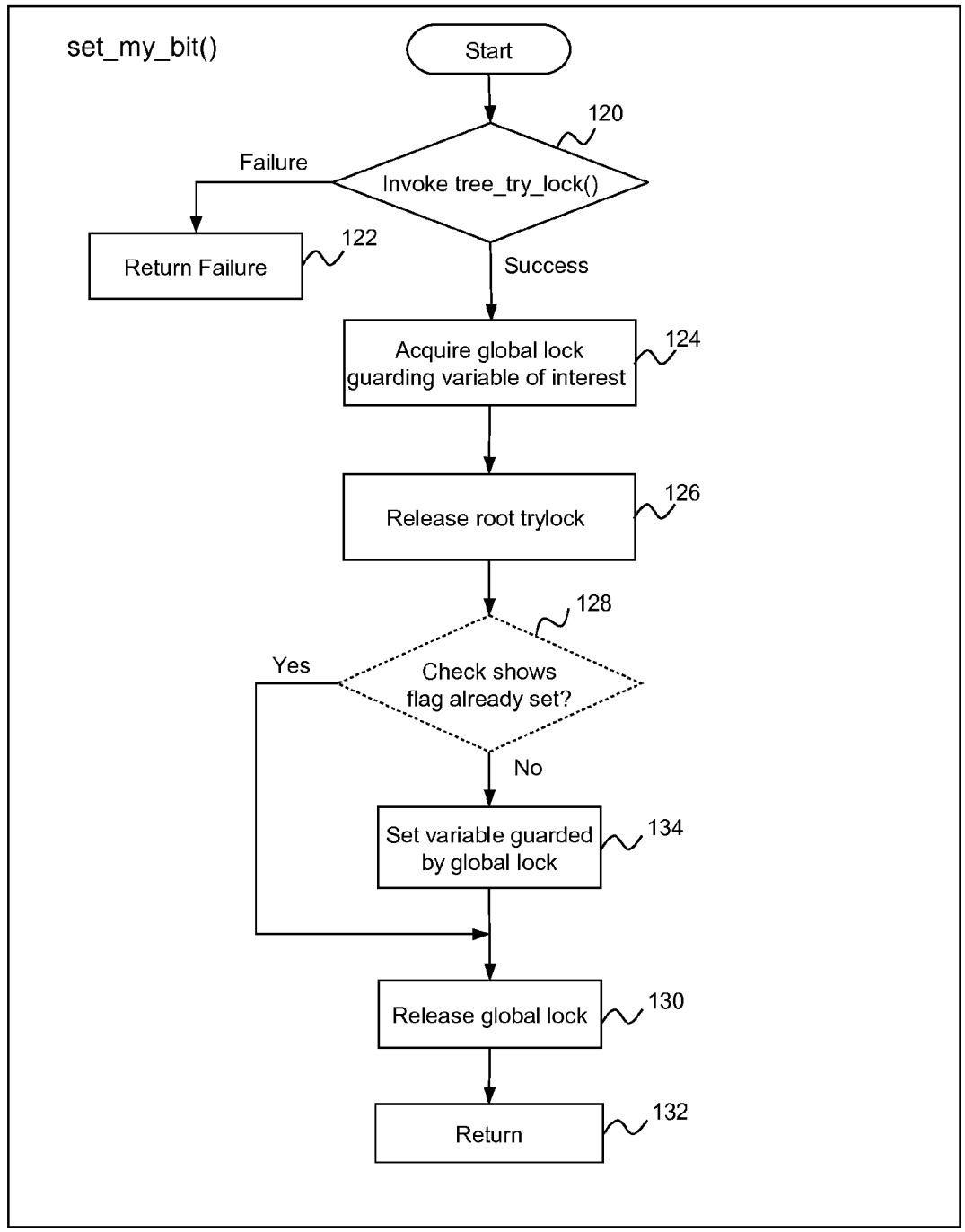
FIG. 19 is a flow diagram showing example operations of the code shown tree_try_lock( ) function use code shown in FIG. 17.

Turning now to FIGS. 18 and 19, flow diagrams are shown to further elucidate operations of the tree_try_lock( ) function and the set_my_bit function( ) Operations that are considered optional, such as the check( ) function and statistics logging, are shown in dashed-line representation. It is assumed that a tree_lock tree, such as that shown in FIG. 13, has been established and initialized. Block 100 of FIG. 18 (illustrating operations of the tree_try_lock( ) function) starts the loop of lines 15-26 in FIG. 12. So long as the root tree_lock node 86 has not been processed, processing proceeds to block 102, which releases the trylock of the previous tree_lock node so long as the current node is not the initial leaf tree_lock node 82 (see line 18 of FIG. 12). Preferably, the lower level trylock is not released until after the next block 104 is implemented. However, the lower level trylock release can be performed beforehand. Blocks 104 and 106 implement line 16 of FIG. 12. Block 104 attempts to acquire the trylock belonging to the current tree_lock node. Optional block 106 checks to see if the MY_BIT flag has already been set. If the trylock acquisition is unsuccessful or if the MY_BIT flag is set, optional block 108 increments the current tree_lock node's failcount counter (see line 20 of FIG. 12) and block 110 returns failure (see line 21 of FIG. 12). If the trylock acquisition in block 104 is successful, and if the MY_BIT flag is not already set, block 112 prepares for the next pass through the loop (see line 23 of FIG. 12). Assuming the loop successfully processes the root tree_lock node 86 in the foregoing manner, block 114 returns success to the caller (see line 25 in FIG. 12).

Turning now to FIG. 19, which illustrates the set_my_bit( ) function of FIG. 17, block 120 attempts to invoke the tree_try_lock( ) function, and returns failure in block 122 if unsuccessful (see lines 16-17 of FIG. 17). If the root trylock 92 is acquired, block 124 acquires the global mylock guarding the variable of interest, namely, the myflag variable (see line 18 of FIG. 17). Note that as an alternative to using the global mylock, the root trylock 92 could serve as the global lock that protest the myflag variable. Block 126 releases the root trylock 92 (see line 19 of FIG. 17). Optional block 128 checks to see if the MY_BIT flag is already set, and if it is, block 130 releases the global mylock and block 132 returns to the caller (see lines 20-22 in FIG. 17). Assuming the MY_BIT flag is not set, block 134 sets the MY_BIT flag in the myflag variable (see line 24 of FIG. 17), block 130 releases the global mylock, and block 132 returns to the caller (see line 25 of FIG. 17).

Accordingly, a highly scalable tree-based trylock technique has been disclosed. It will be appreciated that the foregoing concepts may be variously embodied in any of a data processing system, a machine implemented method, and a computer program product in which programming logic is provided by one or more machine-readable non-transitory data storage media for use in controlling a data processing system to perform the required functions. Example embodiments of a data processing system and machine implemented method were previously described in connection with FIG. 4-19. With respect to a computer program product, digitally encoded program instructions may be stored on one or more computer-readable non-transitory data storage media for use in controlling a computer or other digital machine or device to perform the required functions. The program instructions may be embodied as machine language code that is ready for loading and execution by the machine apparatus, or the program instructions may comprise a higher level language that can be assembled, compiled or interpreted into machine language. Example languages include, but are not limited to C, C++, assembly, to name but a few. When implemented on a machine comprising a processor, the program instructions combine with the processor to provide a particular machine that operates analogously to specific logic circuits, which themselves could be used to implement the disclosed subject matter.

Figure 20:
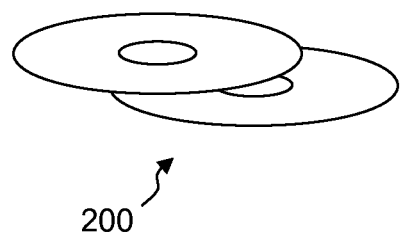
FIG. 20 is a diagrammatic illustration showing example computer-readable non-transitory data storage media that may be used to provide a computer program product in accordance with the present disclosure.

Example computer-readable non-transitory data storage media for storing such program instructions are shown by reference numerals 8 (memory) and 10 (cache) of the computer system 2 of FIG. 4. The system 2 may further include one or more secondary (or tertiary) storage devices (not shown) that could store the program instructions between system reboots. A further example of computer-readable non-transitory data storage media that may be used to store the program instructions is shown by reference numeral 200 in FIG. 20. The data storage media 200 are illustrated as being portable optical storage disks of the type that are conventionally used for commercial software sales, such as compact disk-read only memory (CD-ROM) disks, compact disk-read/write (CD-R/W) disks, and digital versatile disks (DVDs). Such data storage media can store the program instructions either alone or in conjunction with an operating system or other software product that incorporates the required functionality. The computer-readable non-transitory data storage media could also be provided by other portable data storage media (such as floppy disks, flash memory sticks, etc.), or data storage media combined with drive systems (e.g. disk drives). As is the case with the memory 8 and the cache 10 of FIG. 4, the computer-readable non-transitory data storage media may be incorporated in data processing platforms that have integrated random access memory (RAM), read-only memory (ROM) or other semiconductor or solid state memory, all of which represent further examples of computer-readable non-transitory data storage media. More broadly, the computer-readable non-transitory data storage media could comprise any electronic, magnetic, optical, infrared, semiconductor system or apparatus or device, or any other tangible entity representing a machine, manufacture or composition of matter that can contain, store, communicate, or transport the program instructions for use by or in connection with an instruction execution system, apparatus or device, such as a computer. For all of the above forms of computer-readable non-transitory data storage media, when the program instructions are loaded into and executed by an instruction execution system, apparatus or device, the resultant programmed system, apparatus or device becomes a particular machine for practicing embodiments of the method(s) and system(s) described herein.

Although various example embodiments have been shown and described, it should be apparent that many variations and alternative embodiments could be implemented in accordance with the disclosure. It is understood, therefore, that the invention is not to be in any way limited except in accordance with the spirit of the appended claims and their equivalents.

What is claimed is:

1. In a multiprocessor computer system having two or more processors operatively coupled to one or more memory devices, a tree-based trylock method that reduces contention on a root trylock, comprising:

providing a lock hierarchy in which plural trylocks are distributed among nodes of a tree-based node structure having a plurality of leaf nodes, one or more internal nodes, and a root node;

assigning said processors to said leaf nodes in a distributed and balanced manner in order to minimize memory contention on said trylocks;

implementing a trylock acquisition operation on a selected one of said processors for acquiring a root trylock associated with said root node;

said trylock acquisition operation including attempting to acquire one of said trylocks at each node of said node structure that lies on a traversal path beginning at one of said leaf nodes, passing through one or more of said internal nodes, and ending at said root node;

said trylock acquisition operation succeeding if each trylock on said traversal path is acquired, and failing if any trylock on said traversal path cannot be acquired; and performing a trylock housekeeping operation that releases all non-root trylocks visited by said trylock acquisition operation, such that if said trylock acquisition operation succeeds, only said root trylock will be remain acquired at the end of said operation, and if said trylock acquisition operation fails, none of said trylocks will be remain acquired at the end of said operation.

2. The method of claim 1, wherein said root trylock guards a guarded operation for which duplicate initiations are redundant, or guards a global lock that in turn guards said guarded operation.

3. The method of claim 2, wherein said guarded operation comprises read-copy update quiescent state forcing.

4. The method of claim 1, wherein said trylock acquisition operation further includes checking, at each node on said traversal path, a condition indicating that an operation protected by said root trylock has already been initiated by another one of said processors, and failing said trylock acquisition operation if said condition exists.

5. The method of claim 1, wherein said trylock housekeeping operation is performed at each of said nodes on said traversal path by releasing a trylock acquired at an immediately preceding node.

6. The method of claim 1, further including performing a global lock acquisition to acquire a global lock after said trylock acquisition operation successfully acquires said root trylock, said root trylock being released if said global lock acquisition is successful.

7. The method of claim 1, wherein said global lock acquisition operation includes checking a condition indicating that an operation guarded by said global lock has already been initiated by another one of said processors, and failing said global lock acquisition operation if said condition exists.

* * * * *